United States Patent [19]

Barry et al.

[11] Patent Number: 4,607,066
[45] Date of Patent: Aug. 19, 1986

[54] MINE STOPPING SEALANT

[75] Inventors: Leon F. Barry; James A. Berry, both of St. Petersburg, Fla.

[73] Assignee: The Celotex Corporation, Tampa, Fla.

[21] Appl. No.: 739,257

[22] Filed: May 30, 1985

[51] Int. Cl.$^4$ ............................................. E21B 33/138
[52] U.S. Cl. ..................................... 523/130; 166/294; 166/295; 252/8.512; 252/8.513; 299/11; 405/264
[58] Field of Search ....................... 252/8.5 A, 8.5 LC; 166/294, 295; 405/264; 299/11; 523/130, 131

[56] References Cited

U.S. PATENT DOCUMENTS

| | | | |
|---|---|---|---|
| 2,976,203 | 3/1961 | Young et al. | 154/140 |
| 3,016,713 | 1/1962 | Deming | 523/131 |
| 3,421,584 | 1/1969 | Eilers et al. | 166/33 |
| 3,502,149 | 3/1970 | Pense, Jr. | 166/295 |
| 3,651,001 | 3/1972 | Meckbach et al. | 260/29.6 |
| 3,894,980 | 7/1975 | DeTommaso | 260/29.6 RW |
| 4,059,551 | 11/1977 | Weiant et al. | 260/29.6 H |
| 4,130,442 | 12/1978 | Petersen et al. | 134/4 |
| 4,390,570 | 6/1983 | Rehberg | 427/385.5 |
| 4,429,084 | 1/1984 | Piccirilli et al. | 526/88 |
| 4,475,847 | 10/1984 | Cornely et al. | 405/264 |
| 4,495,228 | 1/1985 | Cornwell | 427/385.5 |
| 4,510,180 | 4/1985 | Cornely et al. | 427/136 |

OTHER PUBLICATIONS

"Elastomeric Roof Mastics," Product Bulletin, Rohm and Haas Company.

Primary Examiner—Paul R. Michl
Attorney, Agent, or Firm—James W. Grace; Charles W. Vanecek

[57] ABSTRACT

A process for coating geological formations and mine stoppings by applying to these substrates an aqueous, non-cementitious sealant composition comprising a water-soluble or water-dispersible polymeric binder, filler material and water, and allowing the sealant composition to dry to form an air flow resistant coating on the substrates. A highly satisfactory polymeric binder is used in the form of a polymer emulsion, such as an emulsion of an acrylic polymer having a low Tg and being sufficiently plasticized to provide a coating having prolonged air flow resistance.

16 Claims, No Drawings

MINE STOPPING SEALANT

BACKGROUND OF THE INVENTION

1. Field of the Invention

This invention relates to a sealant for geological formations and mine stoppings. The sealant is especially suitable as a coating for the stoppings and ribs and roofs of coal mines.

2. Description of the Prior Art

Stopping devices are used to control and direct the flow of air through underground passageways and to seal off portions of a mine. The stoppings are often installed in mines so as to direct air flow to the working face and prevent loss of air flow through cross cuts and entries which are not being worked. In ventilating the mine, fresh air is delivered under pressure to the working face and often must travel a considerable distance between the mine opening and the face of the mine. If the stoppings separating the crosscuts and entries are not sufficiently air-tight, the losses will be such as to effectively reduce the velocity of the air at the mine face. It is not uncommon for a mine to lose more than half of its induced air through leaking stoppings and doors. Consequently, the dust and gases in the area being worked by the miners will not be effectively removed to the outside of the mine.

Conventional stoppings consist of walls constructed of concrete blocks and cement, and are not very airtight. Sealants are employed to lessen stopping leaks. Current mine sealants generally are composed of various inorganic aggregates, including glass fibers, in conjunction with portland cement, and are characterized by a number of deficiencies. Because these sealants are applied at minimum thicknesses, are fragile and have limited adhesion to various substrates, such as trona ore, they crack readily whenever minor substrate movement occurs, resulting in spalling and hence loss of resistance to air leakage. Prior to application of these sealants, the pretreatment of mine ribs and roof areas is usually specified and/or required to enhance bonding and prevent dusting of the portland cement base. The recommended pretreatment is high pressure washing to remove rock dust and dirt. This is a labor-intensive and time-consuming operation requiring a water source, a significant amount of equipment and costly delays before sealant can be applied to pretreated areas. Further disadvantages of current sealants are their extremely short pot-life after mixing and the long time required after application for hardening (4–8 hours) and for the attainment of significant air and moisture resistant properties (in excess of 24 hours). Furthermore, the glass fiber often used is attacked by the high alkalinity of the hydrated portland cement, and therefore loses much of its tensile strength in just a few days. Other factors contributing to the high cost of using current sealants are the large dry storage areas required for raw material and equipment and the considerable manpower requirements throughout the operation.

It would be highly desirable if an improved sealant for application to mine stoppings and like formations could be found to overcome the above and other disadvantages of the prior art, and result in the provision of highly airtight constructions which can resist air infiltration for extended periods of time.

OBJECTS OF THE INVENTION

It is therefore an object of the present invention to provide an improved sealing composition and method, which can eliminate or reduce mine stopping air leakage and accordingly contribute to a satisfactory ventilation efficiency in the mine, with resulting health and safety benefits to the miners and lower ventilating power consumption.

It is another object of this invention to provide a mine stopping or similar construction protected against air leaks through a novel sealing system.

These and other objects and advantages of the present invention will become apparent to those skilled in the art from the following detailed description.

SUMMARY OF THE INVENTION

The above objects have been achieved through the development of a non-cementitious elastomeric sealant composition for sealing off underground openings. The sealant is especially useful in coal mines to minimize leakage of ventilation controls, e.g., stoppings, and also spalling and delamination of mine ribs and roofs. The sealant is a highly thixotropic composition broadly comprising a water-soluble or water-dispersible polymeric binder, filler material, which is preferably inorganic, and water. Glass fibers provide a highly suitable reinforcement for the composition.

The binding agent employed may be any polymer or copolymer which will dry to form a water-insoluble film and this type of material is well known to those skilled in the art. The binding agents include polyethylene polymers, polystyrene polymers, polyacrylic polymers, polyvinyl acetate polymers, etc. The polymers are frequently sold commercially as aqueous emulsions but some are also available in water-soluble forms or as the solid polymer. The latter can be made into dispersions by anyone skilled in the art. In general, a satisfactory water-soluble or water-dispersible polymer is one having an average molecular weight of between about 10,000 and 10,000,000.

Preferred binding agents are water-soluble or water-dispersible acrylic polymers. Self-plasticizing acrylic polymer emulsions are especially preferred binders of the invention. Sealant compositions containing the non-externally plasticized acrylic polymers form a mine stopping coating characterized by unusual flexibility, strength of elongation and adhesion.

The polymeric binder is combined with inert pigments or fillers (i.e., the filler material) and, if necessary, auxiliary agents to impart to the sealant the appropriate thixotropic rheology for sealing and bridging the fissures in mine stoppings or like formations and to impart other desirable properties, such as acceptable fire performance characteristics with low smoke generation. The aqueous sealant composition generally comprises about 6.0 to 26.0% by weight of polymeric binder, 25 to 45% by weight of filler material and 17 to 50% by weight of water.

The composition of the invention can be applied quickly and easily by brush, trowel or spray to the surface being sealed, with no special tools or site preparation required. The lightweight sealant is conveniently brought to the application site, e.g., a coal mine stopping, in a premixed and ready-to-use condition. One 3-gallon container of sealant is generally sufficient for one normal size ventilation stopping. The water based sealant provides excellent coverage and seals against air leaks immediately upon application, and its use is characterized by an easy cleanup.

DETAILED DESCRIPTION OF THE INVENTION

The sealant composition of this invention is highly effective for use in underground coal mines to reduce sloughing of coal ribs and shale roofs and to seal block stoppings against air losses. The composition comprises an elastomeric, water based polymeric sealant which is especially useful in enhancing the performance of conventional mine stoppings by preventing air infiltration for longer periods of time than conventional sealants.

The polymeric binding agent comprises water-soluble or water-dispersable homopolymers and copolymers having an average molecular weight of at least about 10,000. Illustrative of the polymeric binder are the various homopolymers and copolymers of acrylates, methacrylates, acrylamides, methacrylamides, acrylic acid, methacrylic acid, various water-soluble or water dispersible copolymers of maleates and fumarates and of various N-substituted acrylamides such as N-methyl acrylamide and N-propyl acrylamide, polymers prepared using the amides and half amides of maleic, fumaric and itaconic acids, and homopolymers and copolymers prepared by polymerizing one or more of the following monomers: vinyltoluene sulfonate, vinylbenzyl sulfonate, styrene sulfonate, vinyloxazolidinone, methyl-substituted oxazolidinone, ethylene oxide, vinylpyrrolidone, vinyl alcohols, etc.

The polymeric binder preferably comprises an acrylic homo- or copolymer. The acrylic desirably has a low glass transition temperature, e.g., below 0° C., and is sufficiently plasticized to provide improved flexibility in the sealant. Especially preferred binders are self-plasticizing thermoplastic acrylic polymers characterized by a low Tg and excellent flexibility. The low Tg (−45° C.) emulsion polymer with internal plasticizer supplied by Rohm and Haas Company under the trademark Rhoplex EC-1685 is an example of such a polymer. Sealant compositions containing this polymer have highly desirable elongation and strength characteristics and good adhesion to the mine substrate.

Many types of water-insoluble fillers may be employed in the sealant composition. Illustrative of the fillers which may be used are glass, such as crushed glass, quartz, silica, barytes, limestone, sulfates, alumina, various clays, diatomaceous earth and other like inert materials, wollastonite, mica, perlite, flint powder, kryolite, alumina trihydrate, talc, sand, pyrophylite, granulated polyethylene, aluminum oxide, zinc oxide, titanium dioxide, and mixtures thereof.

The sealant composition of the invention suitably comprises 6 to 26, more preferably 6 to 20, most preferably 10 to 15, % by weight on a dry basis of a water-soluble or water-dispersible polymeric binder; 25 to 45, more preferably 25 to 43, most preferably 35 to 40, % by weight of the filler; and 17 to 50, more preferably 17 to 45, most preferably 35 to 40, % by weight of water. The composition generally has a viscosity (Brookfield) of 7500 to 25,000 centipoises measured at 24° C., and a total solids content of from 32 to 62 weight percent.

The aqueous sealant desirably contains a dispersing agent for suitable dispersion of the composition. From about 0.5 to 10.0% by weight of the dispersant is generally employed. Examples of dispersants that may be used are the anionic types, e.g., the higher fatty alcohol sulfates, such as sodium lauryl sulfate, sulfonates, such as the sodium salt of t-octylphenyl sulfonate, the sodium dioctyl sulfosuccinates, etc., the sodium phosphates, such as sodium hexametaphosphate, and the nonionic types, e.g., the ethylene oxide derivatives of nonylphenol and tert-octylphenol having 8 to 50 oxyethylene units in the molecule.

The aqueous sealant also advantageously contains an effective amount of a wetting agent for enhancing bonding. Examples of desirable wetting agents are polyoxypropylenepolyoxyethylene copolymers, the sodium dioctyl sulfosuccinates, tetramethyl decynediol, etc.

To improve the viscosity and flow properties of the sealant composition, a thickening agent is advantageously included in an amount of about 0.5 to 1.5% by weight of the composition. The amount of such thickening agent, when used, is generally selected to provide a viscosity in the composition of about 7500 to 25,000 centipoises. The viscosity is measured at 24° C. with a Brookfield viscometer. Examples of thickening agents include bentonite clays, natural gums, such as gum tragacanth and gum arabic, polyvinyl alcohol, hydrolyzed polyacrylonitrile, polymers of acrylic acid and methacrylic acid, water-soluble cellulose ethers, such as methyl cellulose, ethyl cellulose, hydroxyethyl cellulose, carboxymethyl cellulose, sodium alginate, ammonium alginate, and the like.

Any tendency of the composition of the invention to foam can be countered by mixing therewith known foam inhibitors, e.g., silicone oils, blends of petroleum derivatives, esters, and surface active agents in a small but effective amount, e.g., between about 0.001 and 0.10% by weight, based on the total weight of the composition.

The addition of a biocide or bactericide (preservative) may be desirable where the sealant composition is to be exposed to attack by biologically active organisms as, for example, bacteria, fungi, mould, and the like. Among the preferred biocides which may be used if desired are 2,3,5,6-tetra-chloro-4-methylsulfonyl pyridine, 10,10'-oxybisphenoxarsine, 1,2-dibromo-2,4-dicyanobutane, the chlorinated phenols and their salts, and other biocidal compounds known to those skilled in the art.

The sealant composition may be colored or substantially colorless. Besides depending on the color of fillers mentioned above, suitable colored pigments may be added in place of, or in addition to, the fillers. Also, if desired, direct dyes may be introduced to provide a desired color.

Further auxiliary agents which may be used in the sealant composition of the invention include buffers, plasticizers, coalescents, disinfectants, preservatives, and stabilizers (e.g., an anti-freeze material).

A typical sealant composition for coating mine stoppings in accordance with the present invention is as follows:

| Ingredient | Example(s) | Content (Weight %) |
| --- | --- | --- |
| Polymer Binder | acrylic polymer | 6–26 |
| Filler (Pigment) | titanium dioxide, alumina trihydrate, mica, silica, calcium carbonate | 25–45 |
| Dispersing Agent | sodium hexametaphosphate, sodium salts of polymeric carboxylic acids, polyacrylate solutions | 1–3 |
| Thickening Agent | hydroxyethyl cellulose, carboxymethyl cellulose, | 0.5–1.5 |

-continued

| Ingredient | Example(s) | Content (Weight %) |
| --- | --- | --- |
| | bentonite clay | |
| Defoamer | petroleum derivative blends | 0.1–0.3 |
| Stabilizer (freeze/thaw) | ethylene glycol | 1–2 |
| Preservative | dicyanobutane | .075–0.3 |
| Coalescent | trimethylpentanediol-monoisobutyrate | 0.2–0.9 |
| Stabilizer (pH) | ammonium hydroxide | .05–0.1 |
| Wetting agent | polyoxypropylene-polyoxyethylene copolymer | |
| Fiber Glass | ½" E glass | 0.5–3.0 |
| Water | Local source (potable) | 17–50 |

The sealant composition may be applied in various ways. For example, it may be applied by brush, roller, trowel, knife, spraying, and so on. Coating thicknesses on the order of 1 to 40 mils are readily obtained. Spray application has been found especially useful where the sealant includes fibrous reinforcement. Such fibers, which typically have lengths in a range of about ¼ to 2 inches, are employed to enhance the sealant's bridging characteristics. Filled sealant coatings containing glass fibers having a length of about ½ inch exhibit an excellent bridging capacity and are readily sprayable onto the surface being treated. These coatings have been found to suitably span cracks on the sprayed surface of as much as ½ inch. Commercially available chopped "E" glass, M diameter, supplied, for example, by PPG Industries, Inc. and Owens/Corning Fiberglas Corp., may be advantageously employed. A highly useful apparatus for applying the filled sealant composition is a multi-head spray gun manufactured by Quikspray, Inc., Port Clinton, Ohio. For application of coatings to large areas in field service, the Quikspray gun is equipped with a volume-head having a 1 inch material inlet.

The physical properties of the sealant composition of the invention make it ideally suited for coating mine ventilation stoppings, ribs and roofs to make the coated surfaces resistant to air leaks and weathering. The sealant is lightweight (ca. 11.0 lbs. per gallon) and so can be easily transported to the application site. Unlike conventional sealants, which typically have about a 2–3 month storage life and a very short, e.g., 1 hour, pot life after mixing, the present sealant can be stored for a period in excess of 1 year and for practical purposes has an unlimited pot life. Whereas at the application site conventional sealants commonly require mixing equipment, special application equipment, a source of water, and a power source for mixing and application, thus increasing operational cost, the present sealant is ready as received at the site for easy application by brush, or spray, without dilution, mixing or the need for special equipment or power. Also, the expenses associated with the cleanup of such equipment are avoided through this invention. In any event, cleanup of the sealant of the invention is easily accomplished with water or soap and water solution. Further cost savings are realized because little manpower is needed to apply the present sealant, only one person being required for application of the sealant of the invention to a stopping, while a minimum of two people is commonly needed for conventional sealants.

The coverage or spreading rate (mileage) attainable with the composition of the invention is excellent, as can be seen in the following results showing the extent of coverage of various coating thicknesses per gallon of sealant.

| SPREADING RATE | |
| --- | --- |
| DRY FILM THICKNESS, inch | SQUARE FEET/GAL. |
| .001 | 565 |
| .003 | 188 |
| .005 | 113 |
| .007 | 81 |
| .010 | 56.5 |
| .015 | 38 |
| .020 | 28 |

The coating of a mine ventilation stopping with the water based polymeric binder system in accordance with the present invention results in an effective seal against air leaks immediately upon application. The drying rate of the sealant will depend upon ambient conditions. The data presented in the following table reveals the efficiency of the process of the invention in sealing a typical 7 feet high by 20 feet wide (140 sq. ft.) stopping and furnishes comparative results for conventional sealants.

| SEALANT | COMPARISON OF INVENTIVE AND CONVENTIONAL SEALANT SYSTEMS | | |
| --- | --- | --- | --- |
| | APPLICATION UNIT | COVERAGE PER BAG | SEALANT REQUIRED PER STOPPING |
| INVENTIVE | 5 gal. pail | | 1.25 gal. (.005 in. dry film thickness) 2.50 gal. (.010 in. dry film thickness) 5.0 gal. (0.20 in. dry film thickness) |
| BEN COAT[1] | 50 lb. bag | 30–50 sq. ft. | 3–5 bags |
| B-BOND[1] | 50 lb. bag | 30–50 sq. ft. | 3–5 bags |
| MANDOSEAL[2] | 40 lb. bag | 25–30 sq. ft. | 5–6 bags |

[1] Ben Coat and B-Bond are cementitious products supplied by Benco Industrial Supply, Inc., Greensburg, Pa.
[2] Mandoseal is a cementitious product supplied by J. P. Austin Associates, Inc., Mandoseal Corp., Pittsburgh, Pa.

The cured sealant coating of the invention is nonflammable. Testing has shown that the sealant does not present a flammability hazard when applied to noncombustible ventilation controls or to rib or roof strata is underground mine passageways. E-84 Flame Spread testing of the sealant coating applied in a film thickness of 0.003–0.005 in. (1 brush coat) on an asbestos-cement board yielded a flame spread of less than 5 ft. and a smoke value of 49.

The preferred sealant composition incorporating a low Tg acrylic polymer produces flexible film coatings with exceptional resistance to cracking and good film elongation properties (in excess of 100%). The films pass a 180° bend at −30° F. with no rupture, and have 60% recovery after 25% elongation. The coatings display excellent adhesion to not only conventional mine stopping construction materials, but also diverse mine seams and strata, including those found in mines with trona ore [$Na_3H(CO_3)_2 \cdot 2H_2O$], where adhesion is a particular problem. Furthermore, blending of the acrylic polymer with the filler materials of the invention enhances the crack and fissure spanning capability of the sealant, and also imparts class I flame spread and low smoke generation properties. Because of these valuable properties, the sealant, even when applied as a thin film, strongly adheres to the mine substrate which commonly is in continual motion, without embrittling or cracking and thereby insures an integral seal over the stopping and surrounding strata. Accordingly, there is a minimization or elimination of spalling, an overall reduction of dust, and an extension in stopping life, with a concomitant savings in ventilation cost, material and manpower.

The present invention is further illustrated by the following example in which all percentages are by weight.

EXAMPLE

This example illustrates the preparation of a typical sealant composition by combining the ingredients listed in the following Table according to the procedure described below:

TABLE

| Ingredient | Percentage |
| --- | --- |
| Potable Water | 37.00 |
| Sodium Hexametaphosphate (primary dispersant) | 0.06 |
| Ethylene Glycol | 1.09 |
| Defoamer[1] | 0.23 |
| Bentonite Clay | 0.78 |
| Titanium Dioxide | 4.45 |
| Alumina Trihydrate | 9.78 |
| 1K Mica | 4.45 |
| Amorphous, Microcrystalline Silica | 8.90 |
| Calcium Carbonate | 8.0 |
| 1,2-Dibromo-2,4-Dicyanobutane | 0.11 |
| $NH_4OH$ | 0.09 |
| Acrylic Emulsion[2] | 20.33 |
| 2,2,4-Trimethylpentanediol-1,3-Monoisobutyrate | 0.42 |
| Pluronic E-64[3] | 0.19 |
| Acrysol G-110[4] (secondary dispersant) | 2.62 |
| ½" E Glass Fibers | 1.50 |

[1] Supplied by Diamond Shamrock Corp. under the trade name Nopco NXZ.
[2] Supplied by Rohm and Haas Company under the trade name Rhoplex EC-1685.
[3] A polyoxypropylene-polyoxyethylene copolymer supplied by BASF Wyandotte Chemical Corp.
[4] A polyacrylate solution polymer supplied by Rohm and Haas Company.

The ingredients were combined in the order listed in the Table, except that a portion of the water was held out for viscosity let-down at the end of the mix. A major portion of the water, the primary dispersant, ethylene glycol, defoamer, and clay thickener were charged to a mixing vessel and mixed to a homogeneous composition. The fillers (pigments) were then charged to the vessel and mixed to a uniform consistency, free of lumps and pigment agglomeration in what is commonly known as the "grind" phase. Upon completion of this phase, the biocidal, pH stabilizer, and acrylic emulsion were added to the mix (the initial let-down). After this initial let-down, the coalescent (ester alcohol) and wetting agent were added and all ingredients were mixed to again yield a uniform blend. Lastly, the secondary dispersant, glass fibers, and remaining water were charged to the vessel. Mixing was performed under minimum shear to maintain fiber length and produce a homogeneous sealant mixture.

The sealant composition was evaluated with the following results:

| Property | Test Result |
| --- | --- |
| % Solids | 50 |
| Density (lbs./gal.) | 11.0 |
| Viscosity | |
| 1. Brookfield (room temperature) No. 6 spindle - 20 rpm | 11–13 M cps |
| 2. Cone Penetration (5 sec.-no wt.) | 358 mm |
| Freeze-Thaw (16 hrs. cold/8 hrs. room temperature) | |
| 32° F. | does not freeze |
| 0° F. | 2 cycles |
| pH | 7.0 |

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A process for coating geological formations and mine stoppings consisting essentially of applying to said substrates an aqueous, non-cementitious sealant composition comprising 6 to 26% by weight of a water-dispersible polymeric binder, 25 to 45% by weight of filler material and 17 to 50% by weight of water, said sealant composition having a viscosity of at least 7500 centipoises measured at 24° C., and allowing said sealant composition to dry to form an air flow resistant coating on said substrates.

2. The process of claim 1 wherein said polymeric binder is an acrylic polymer.

3. The process of claim 1 wherein said polymeric binder is a homopolymer or copolymer of a member selected from the group consisting of acrylates, methacrylates, acrylamides, methacrylamides, acrylic acid, methacrylic acid and mixtures thereof.

4. The process of claim 1 wherein said polymeric binder is an acrylic polymer having a low Tg and being sufficiently plasticized to provide a coating having prolonged air flow resistance.

5. The process of claim 1 wherein said sealant composition additionally contains an effective amount of at least one component selected from the group consisting of a dispersing agent, a thickening agent, a defoamer, an anti-freeze stabilizer, a preservative, a coalescent, a pH stabilizer, a wetting agent, a fibrous material and mixtures thereof.

6. The process of claim 1 wherein said filler material is a member selected from the group consisting of titanium dioxide, alumina trihydrate, mica, silica, calcium carbonate and mixtures thereof.

7. The process of claim 6 wherein said polymeric binder is an acrylic polymer.

8. The process of claim 7 wherein said sealant composition comprises 10 to 15% by weight of said acrylic polymer, 35 to 40% by weight of said filler material and 35 to 40% by weight of water.

9. The process of claim 8 wherein said acrylic polymer has a low Tg and is sufficiently plasticized to provide a coating having prolonged air flow resistance.

10. The process of claim 1 wherein said filler material is a member selected from the group consisting of titanium dioxide, alumina trihydrate, mica, silica, calcium carbonate and mixtures thereof, and said sealant composition additionally contains an effective amount of at least one component selected from the group consisting of a dispersing agent, a thickening agent, a defoamer, an anti-freeze stabilizer, a preservative, a coalescent, a pH stabilizer, a wetting agent, a fibrous material and mixtures thereof.

11. The process of claim 10 wherein said polymeric binder is an acrylic polymer.

12. The process of claim 11 wherein said acrylic polymer has a low Tg and is sufficiently plasticized to provide a coating having prolonged air flow resistance.

13. The process of claim 12 wherein said sealant composition comprises 10 to 15% by weight of said acrylic polymer, 35 to 40% by weight of said filler material and 35 to 40% by weight of water, and said dispersing agent is sodium hexametaphosphate, said thickening agent is bentonite clay, said defoamer is a petroleum derivative blend, said anti-freeze stabilizer is ethylene glycol, said preservative is dicyanobutane, said coalescent is trimethylpentanediolmonoisobutyrate, said pH stabilizer is ammonium hydroxide, said wetting agent is a polyoxypropylene-polyoxyethylene copolymer, and said fibrous material is chopped glass fiber.

14. In a process for sealing geological formations and mine stoppings by applying to said substrates a sealant composition and allowing said sealant composition to dry to form an air flow resistant coating on said substrates, the improvement consisting essentially of applying an aqueous, non-cementitious mixture comprising a water-dispersible polymeric binder, filler material and water and having a viscosity of at least 7500 centipoises measured at 24° C.

15. The process of claim 14 wherein said polymeric binder is an acrylic polymer.

16. The process of claim 15 wherein said acrylic polymer has a low Tg and is sufficiently plasticized to provide a coating having prolonged air flow resistance.

* * * * *